(12) United States Patent
Egnor et al.

(10) Patent No.: US 7,891,966 B2
(45) Date of Patent: Feb. 22, 2011

(54) DEPANNING DEVICES AND METHODS OF USING SAME

(75) Inventors: Richard P. Egnor, Huntsville, OH (US); Kent Kleinholz, Dublin, OH (US)

(73) Assignee: Nestec S.A., Vevey (CH)

( * ) Notice: Subject to any disclaimer, the term of this patent is extended or adjusted under 35 U.S.C. 154(b) by 341 days.

(21) Appl. No.: 11/854,400

(22) Filed: Sep. 12, 2007

(65) Prior Publication Data

US 2009/0068329 A1    Mar. 12, 2009

(51) Int. Cl.
*B29C 39/36* (2006.01)
*B29C 45/40* (2006.01)

(52) U.S. Cl. ............... 425/439; 249/66.1; 249/69; 425/436 RM

(58) Field of Classification Search ......... 249/66.1, 249/69, 70, 71, 72, 73; 414/222.11, 758, 414/773; 425/439, 436 RM, 139; 426/389; 221/167, 169, 188, 194

See application file for complete search history.

(56) References Cited

U.S. PATENT DOCUMENTS

| | | | | |
|---|---|---|---|---|
| 833,952 A * | 10/1906 | Brown | ............. | 249/70 |
| 1,574,565 A * | 2/1926 | Ferguson | ............. | 425/432 |
| 2,164,832 A * | 7/1939 | Nitardy | ............. | 206/534.1 |
| 2,435,102 A * | 1/1948 | Rundell | ............. | 62/300 |
| 2,454,958 A * | 11/1948 | Andersson | ............. | 249/72 |
| 2,456,924 A * | 12/1948 | Collister | ............. | 249/72 |
| 2,717,498 A * | 9/1955 | Shagaloff | ............. | 62/71 |
| 2,717,499 A * | 9/1955 | Ashby et al. | ............. | 62/80 |
| 2,717,502 A * | 9/1955 | Barton | ............. | 62/137 |
| 2,903,777 A * | 9/1959 | Mitchell | ............. | 425/439 |
| 3,032,851 A * | 5/1962 | Gibbs | ............. | 425/439 |
| 3,403,768 A | 10/1968 | Tobey et al. | | |
| 3,669,283 A | 6/1972 | Brown, Jr. | | |
| 3,829,056 A * | 8/1974 | Baker et al. | ............. | 249/121 |
| 4,008,034 A * | 2/1977 | Kane | ............. | 425/441 |
| 4,025,265 A * | 5/1977 | Auer | ............. | 425/211 |
| 4,128,377 A | 12/1978 | Bramati | | |
| 4,160,507 A | 7/1979 | Mullins | | |
| 4,214,655 A | 7/1980 | Bernham et al. | | |
| 4,232,777 A | 11/1980 | Smith et al. | | |
| 4,432,529 A * | 2/1984 | McMillan | ............. | 249/52 |
| 4,708,611 A * | 11/1987 | Bouteiller | ............. | 425/62 |
| 4,735,562 A * | 4/1988 | Boutellier | ............. | 425/62 |
| 4,967,995 A * | 11/1990 | Burgess | ............. | 249/70 |
| 5,002,711 A * | 3/1991 | Iwama et al. | ............. | 264/71 |
| 5,188,744 A * | 2/1993 | Silverman | ............. | 249/121 |
| 5,196,127 A * | 3/1993 | Solell | ............. | 249/121 |
| 5,281,125 A * | 1/1994 | Gebhardt | ............. | 425/253 |
| 5,360,309 A | 11/1994 | Ishiguro | | |
| 5,935,617 A * | 8/1999 | Uchida et al. | ............. | 425/134 |
| 6,139,243 A | 10/2000 | Jackson et al. | | |
| 6,398,008 B1 | 6/2002 | Suga | | |
| 6,481,235 B2 * | 11/2002 | Kwon | ............. | 62/353 |

\* cited by examiner

*Primary Examiner*—Yogendra N Gupta
*Assistant Examiner*—Emmanuel S Luk
(74) *Attorney, Agent, or Firm*—K&L Gates LLP

(57) ABSTRACT

Depanning devices and methods of using the depanning devices are provided. In an embodiment, the present disclosure provides a device comprising a rotatable support and a grid attached to the support. The grid comprises one or more movable gates and defines one or more passages. The device can further comprise a tray defining one or more recessed portions. The tray is removably attachable to the rotatable support.

11 Claims, 6 Drawing Sheets

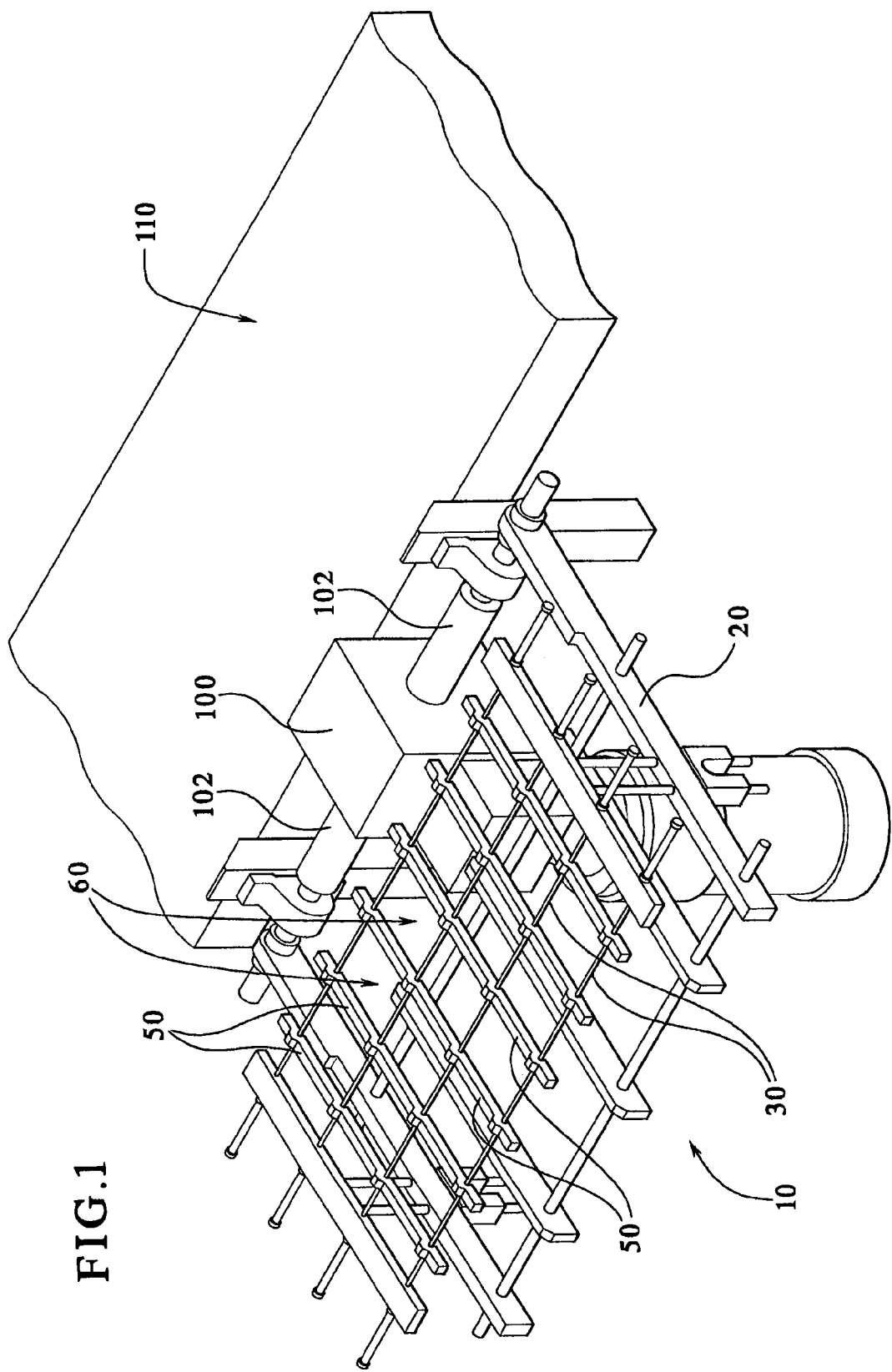

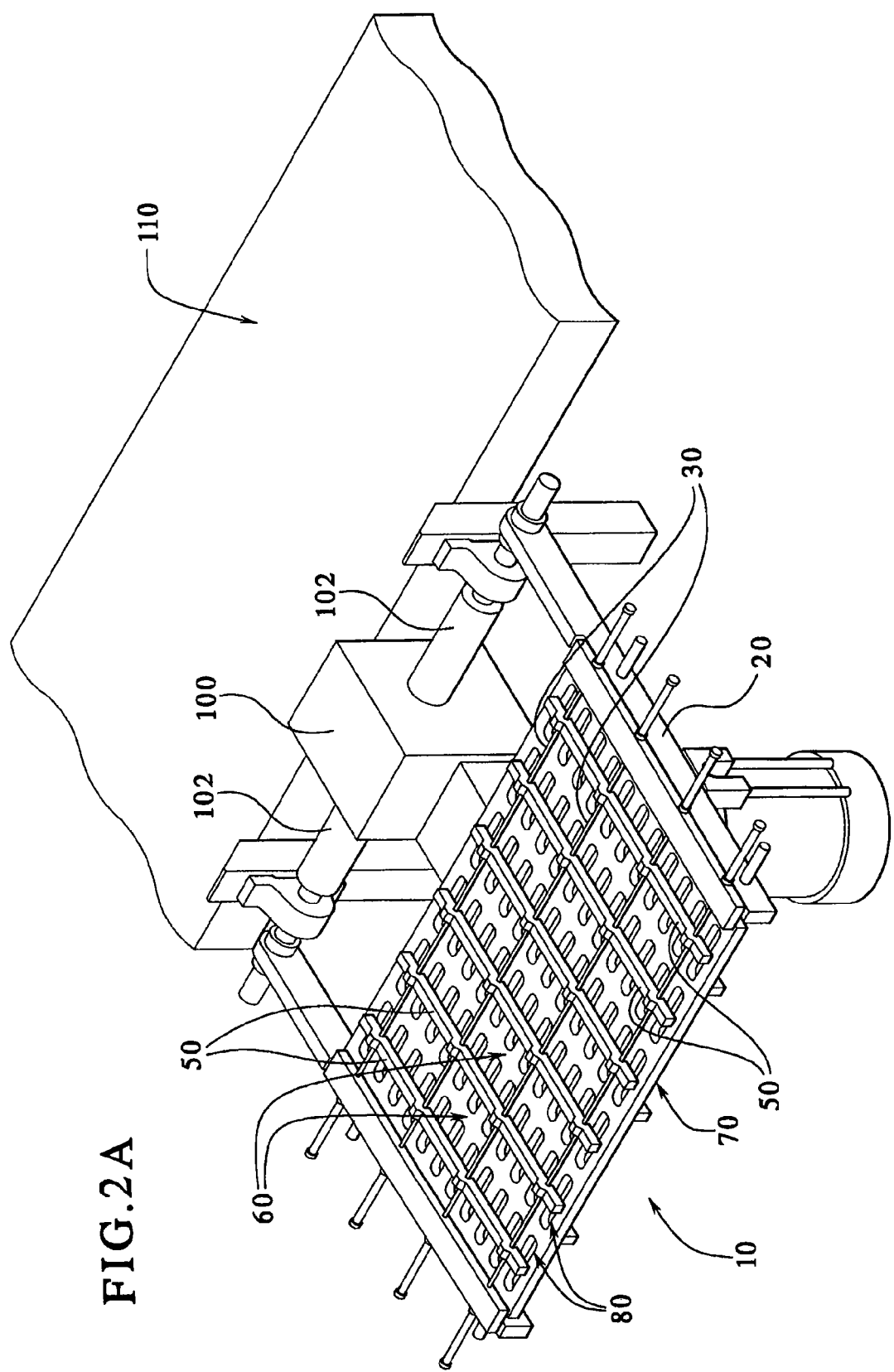

DEPANNING DEVICES AND METHODS OF USING SAME

BACKGROUND

The present disclosure is generally directed to mechanical devices. More specifically the present disclosure is directed to depanning devices and methods of using the depanning devices.

Numerous products made using a tray or pan exist in the market today. These products include candy bars made from chocolate, cookies and various other baked products. Typically, these edible products are manufactured in large quantities. In addition, a single tray may contain as many as 50 or more of the edible products. Removing the vast number of products from each of the pans can be a time consuming and cumbersome task. At the same time, great care must be used to avoid breaking or damaging the products as they are removed from the pans.

SUMMARY

The present disclosure relates to depanning devices and methods of using the depanning devices. In a general embodiment, the present disclosure provides a device comprising a rotatable support and a grid attached to the support. The grid comprises one or more movable gates and defines ones or more passages. The device can further comprise a tray comprising one or more recessed portions. The tray can be removably attachable to the rotatable support.

In an embodiment, the device further comprises a motor attached to the rotatable support so constructed and arranged to rotate the support.

In an embodiment, the device further comprises a product positioned in the recessed portion of the tray.

In an embodiment, the device further comprises a conveyer belt attached to the rotatable support for receiving the product in the tray.

In an embodiment, the product comprises a confectionery product.

In an embodiment, the recessed portion comprises a concave mold.

In another embodiment, the present disclosure provides a device comprising a rotatable support and a grid attached to the support. The grid comprises a plurality of slidable gates and defining a plurality of passages. The device can further comprise a motor comprising a shaft attached to the rotatable support so constructed and arranged to rotate the support and a tray defining a plurality of recessed portions. The tray is removably attached to the rotatable support.

In an alternative embodiment, the present disclosure provides a method of removing a product from a tray. The method comprises providing a rotatable support attached to a grid. The grid comprises a slidable gate and defining at least one passage. The tray containing the product is placed onto the rotatable support so that the grid is positioned in a manner where the gate is over the product in the tray to prevent the product from being released from the tray. The rotatable support is rotated while the product remains in the tray. The gate is then moved to an open position to release the product from the tray.

In an embodiment, the rotatable support is rotated about 180 degrees.

In an embodiment, the method comprises providing a conveyer belt for receiving the product from the tray.

In yet another embodiment, the present disclosure provides a method of depanning a plurality of products. The method comprises providing a rotatable support attached to a grid. The grid comprises a plurality of slidable gates and defines a plurality of passages. The tray defining a plurality of recessed portions that comprise the products is positioned on the rotatable support. The grid is lowered so that each of the gates are positioned over the recessed portions of the tray to prevent the products from being released from the tray. The rotatable support is rotated. The sliding gates are then moved to an open position to release the products from the tray.

An advantage of the present disclosure is to provide improved depanning machines.

Another advantage of the present disclosure is to provide improved methods of depanning a product.

Yet another advantage of the present disclosure is to provide improved methods for reducing the breakage of a product during manufacturing.

Additional features and advantages are described herein, and will be apparent from, the following Detailed Description and the figures.

BRIEF DESCRIPTION OF THE FIGURES

FIG. 1 illustrates a perspective view of the depanning device in an embodiment of the present disclosure.

FIG. 2A illustrates a perspective view of the depanning device with the grid in an upward facing position with the gates in a closed position in an embodiment of the present disclosure.

DETAILED DESCRIPTION

The present disclosure generally relates to depanning devices and methods of using the depanning devices. The depanning devices can be used to remove one, several or a large number of products from trays or holding containers while preventing or reducing breakage of the products. The products can comprise any suitable products that are made in a tray or holding container such as, for example, confectionery products, chocolate bars, baked goods or other molded products. The products can also be non-edible products such as bricks made in trays or holding containers.

Referring now to FIGS. 1-5, in a general embodiment, the present disclosure provides a depanning device 10 comprising a rotatable support 20 and a grid 30 attached to the support 20. In FIG. 1, the grid 30 is in a position away from the support 20. The grid 30 can be constructed and arranged to be able to move towards and away from the support 20 (e.g. while remaining parallel to the surface of the support 20).

The grid 30 can be movably attached to the support 20 in any suitable manner using any suitable connection methods such as, for example, screws, welding, glue, etc. It should also be appreciated that the support 20 and the grid 30 can comprise a single unitary device having the same functional capabilities. The grid 30 and the support 20 can made from any suitable materials such as, for example, metals, metal alloys, plastics or other polymers.

Figure 2B:
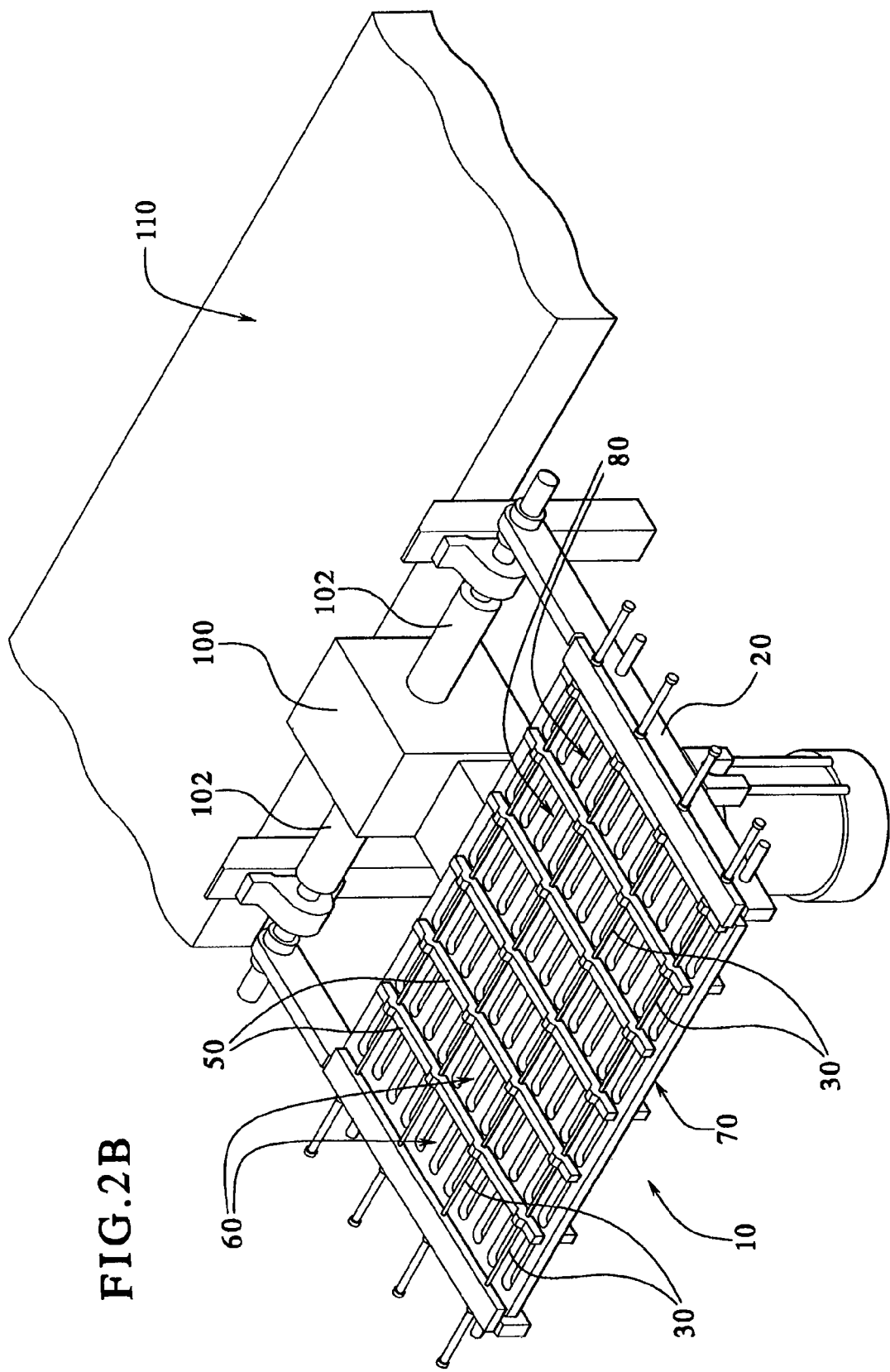
FIG. 2B illustrates a perspective view of the depanning device with the grid in an upward facing position with the gates in an open position in an embodiment of the present disclosure.

In an embodiment, the grid 30 comprises one or more slidable gates 50 and defines at least one passage 60 as shown in FIGS. 1 and 2A-2B. As shown in FIGS. 2A-2B, the device 10 can further comprise one or more trays 70 defining one or more recessed portions 80.

Figure 3:
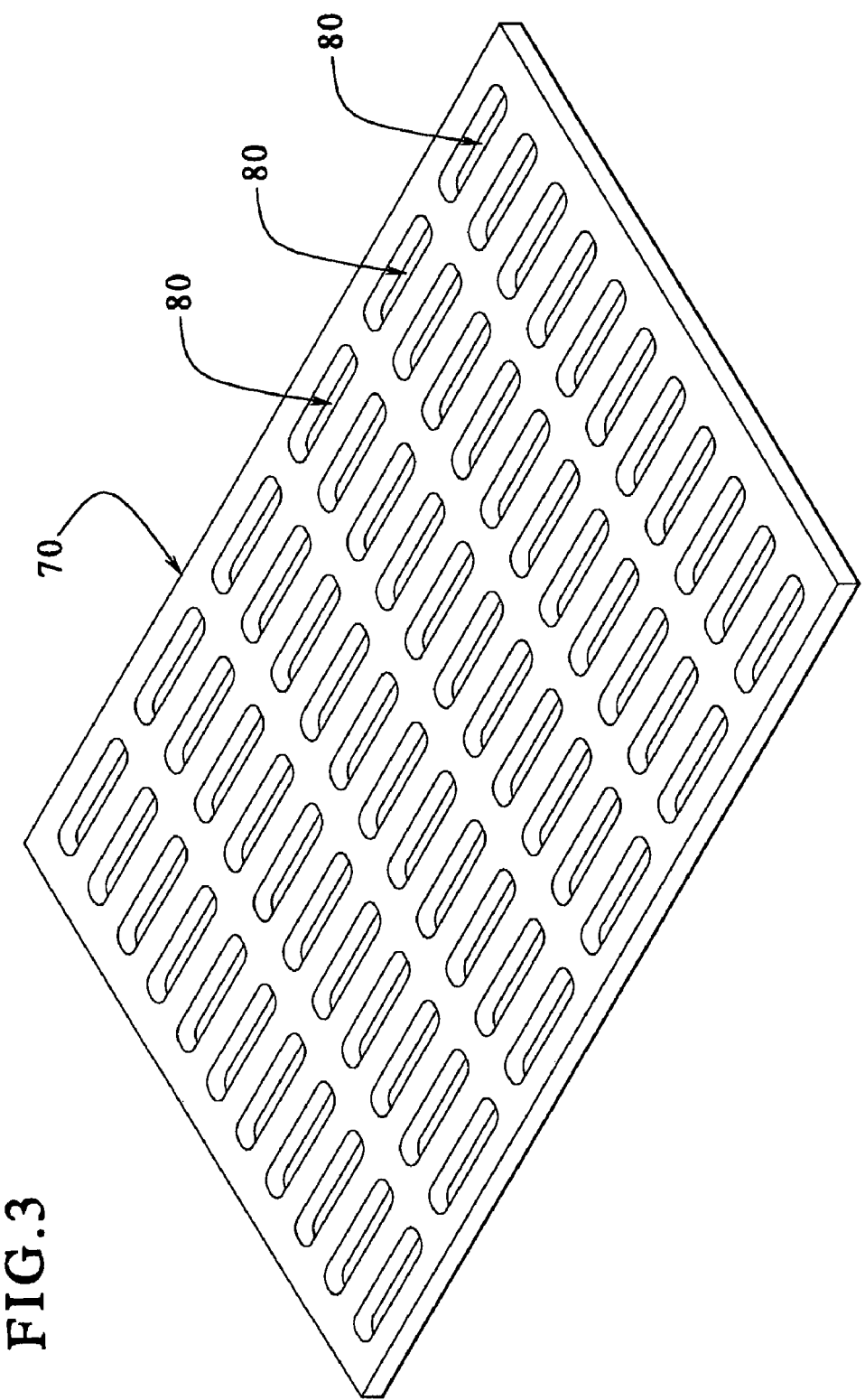
FIG. 3 illustrates a perspective view of the tray in an embodiment of the present disclosure.

FIG. 3 illustrates the individual tray 70 in an embodiment. The tray 70 can be any suitable size or shape and can comprise any suitable number and shape and sizes of the recessed portions such as, for example, concave molds. For example, the tray can comprises 66 concave molds as shown in FIG. 3. In an alternative embodiment, the tray can be a container having any suitable size and shape for holding products.

The tray 70 can be removably attached to the rotatable support 20. The tray 70 can be constructed and arranged to be positioned within the device 10 so that the tray 70 is sandwiched between the support 20 and the grid 30. For example, during placement of the tray 70 in the device 10, the moveably attached grid 30 can lift upwards and/or away from the support 20. The tray 70 can then be placed on the support 20 underneath the grid 30. The grid 30 can then be lowered onto the tray 70 thereby securing or locking the tray in place between the grid 30 and the support 20.

In an embodiment, if the tray comprises an alternate shape, the support and grid can be so constructed and arranged accordingly to receive the tray and lock the tray in place. In another embodiment, the grid can remain stationery with respect to the rotatable support, and the tray can be designed to be securely inserted between the grid and support without the need for raising or lowering the grid.

As shown in FIG. 2A, when the tray 70 is placed within the device 10, the grid 30 is positioned over the tray 70 so that the gates 50 cover at least a part of the recessed portions 80 (i.e. "closed position"). In an embodiment, the gates 50 are slideable, for example, along the grid 30 so that they clear the recessed portions 80 as shown in FIG. 2B (i.e. "open position"). In another embodiment, the gates can be constructed and arranged in any configuration to be moved from the closed position to the open position in any suitable manner to avoid blocking the recessed portions. In an alternative embodiment, the grid and the gates can be constructed and arranged in any suitable manner so that they accomplish the intended objectives of the depanning device 10 of the present disclosure.

Figure 4:
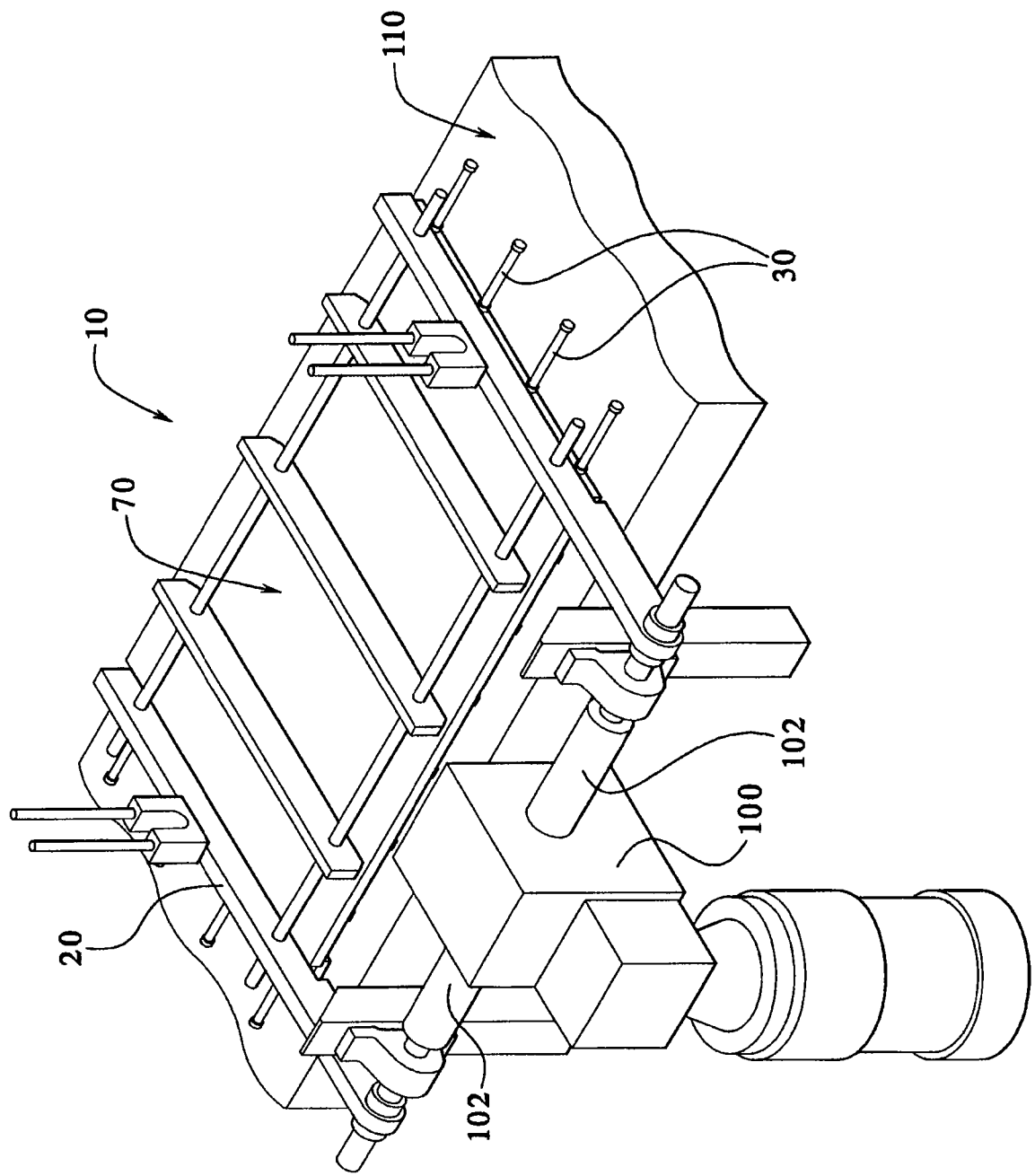
FIG. 4 illustrates a perspective view of the depanning device with the grid in a downward facing position in an embodiment of the present disclosure.

As shown in FIGS. 1, 2A-2B and 4, the device 10 can further comprise a motor 100 attached to the rotatable support 20. The motor 100 can be so constructed and arranged to rotate the support 20, for example, from an upward facing position (FIG. 2A) to a downward facing position (FIG. 4). For example, the motor 100 can comprise a shaft 102 to rotate the support 20 at one end as shown in FIG. 4. Although the motor 100 is shown to rotate the support 20 from one end, the motor 100 can be so constructed and arranged to rotate the support 20 from any place on the support (e.g. end, middle, etc.).

During operation of the depanning device 10 in one embodiment, the tray 70 comprising one or more products within the recessed portions 80 of the tray 70 is placed onto the rotatable support 20 of the depanning device 10. The grid 30 is lowered onto the tray 70 securing or locking it into place on the support 20. The gates 50 are in the closed position thereby covering a portion of the products within the recessed portions 80.

The support 20 is then rotated from an upward facing position to a downward facing position over a product receiving surface such as, for example, a conveyor belt 110 shown in FIG. 4. This keeps the product within the recessed portions 80 of the tray 70 over the product receiving surface. With the support 20 in the downward facing position over the product receiving surface, the gates 50 are moved to the open position so as to be clear of the recessed portions 80 of the tray 70. This allows the product to fall a desired short distance on to the top of the product receiving area. Preferably, the distance the product falls should be designed so that the breaking or damaging of the product is minimized. It should be appreciated that the device 10 can be configured to drop the product from the tray 70 from any suitable distance over the product receiving area.

Figure 5:
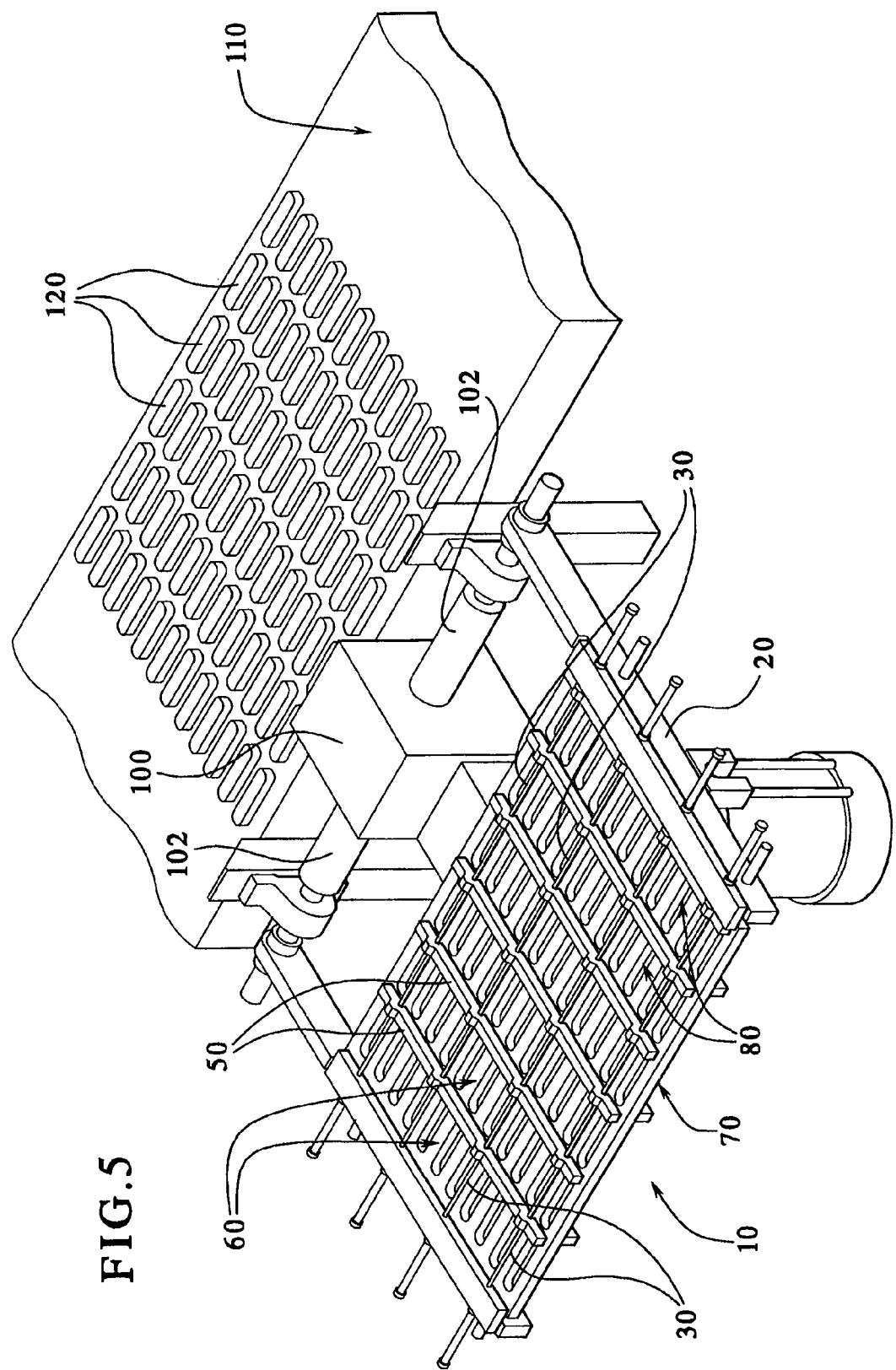
FIG. 5 illustrates a perspective view of the depanning device with the grid in an upward facing position after the product has been depanned product on a conveyor in an embodiment of the present disclosure.

Once the product is removed from the tray 70, the support 10 can be rotated back to its original upward facing position. In addition to preventing or reducing product breakage, the products are placed on the product receiving area in an orderly manner as shown in FIG. 5.

Any suitable product receiving area such as, for example, a conveyor belt or table can be used to receiving the products falling from the trays. If a conveyor belt is used, the conveyer belt can be attached to the rotatable support for receiving the product from the tray. In another embodiment, the conveyor belt is not attached to the rotatable support.

The grid 30 can comprise any suitable number of slidable gates 50 and passages for the product to fall through when the support 20 is in a downward position over the product receiving surface. Preferably, the number of slidable gates should correspond in location and number with the recessed portions of the tray 70, but this is not required.

In another embodiment, the present disclosure can comprise one or more of the depanning devices attached to each other in series. For example, three devices can be attached to each other at their ends and be constructed and arranged to operate at the same time. The three trays can be placed within the supports, locked into position by the grids and rotated over a receiving area. The gates can all be opened at the same time and the products can fall onto the receiving area. This process can be repeated as many times as necessary. Accordingly, more trays can be placed in the depanning devices and more product can be removed from the trays at or around the same for mass depanning of products from the trays.

In an alternative embodiment, the present disclosure provides a method of removing a product from a tray. The method comprises providing a rotatable support attached to a grid. The grid comprises a slidable gate and defining at least one passage. The tray containing the product is placed onto the rotatable support so that the grid is positioned in a manner where the gate is over the product in the tray to prevent the product from being released from the tray. The rotatable support is rotated while the product remains in the tray. The gate is then moved to an open position to release the product from the tray.

The support can be rotated to any suitable angle. In an embodiment, the rotatable support is rotated about 180 degrees.

In yet another embodiment, the present disclosure provides a method of depanning a plurality of products. The method comprises providing a rotatable support attached to a grid. The grid comprises a plurality of slidable gates and defines a plurality of passages. The tray defining a plurality of recessed portions that comprise the products is positioned on the rotatable support. The grid is lowered so that each of the gates are positioned over the recessed portions of the tray to prevent the products from being released from the tray. The rotatable support is rotated until the support is in a downward facing position located a suitable distance over a receiving area. The sliding gates are then moved to an open position to release the products from the tray onto the receiving area. Once the products are released, the rotatable support can be moved back to the upward facing position so that the emptied tray can be replaced with a filled tray.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A device comprising:
    a rotatable support;
    a grid attached to the support, the grid comprising at least one movable gate and defining at least one passage, the movable gate slidable along the grid over the passage to an open position and a closed position; and
    a tray defining at least one recessed portion having a product positioned therein, the tray removably attached to the rotatable support.

2. The device of claim 1 further comprising a conveyer belt attached to the rotatable support for receiving the product in the tray.

3. The device of claim 1, wherein the product comprises a confectionery product.

4. The device of claim 1 further comprising a motor attached to the rotatable support so constructed and arranged to rotate the support.

5. The device of claim 1, wherein the recessed portion comprises a concave mold.

6. The device of claim 5, wherein the tray comprises 66 concave molds.

7. A device comprising:
    a rotatable support;
    a grid moveably attached to the support, the grid comprising a plurality of slidable gates and defining a plurality of passages, the plurality of slidable gates slidable along the grid over the passages to an open position and a closed position;
    a motor comprising a shaft attached to the rotatable support so constructed and arranged to rotate the support;
    a tray defining a plurality of recessed portions having products positioned therein, the tray removably attached to the rotatable support; and
    a conveyer belt attached to the rotatable support for receiving the products in the tray.

8. The device of claim 7, wherein the products comprise confectionery products.

9. The device of claim 7, wherein the products comprise confectionery bars.

10. The device of claim 7, wherein the recessed portions comprise concave molds.

11. The device of claim 10, wherein the tray comprises 66 concave molds.

* * * * *